United States Patent
Kantamneni et al.

(10) Patent No.: US 9,697,021 B2
(45) Date of Patent: Jul. 4, 2017

(54) MODIFIABLE HIGH-LEVEL INTERMEDIATE REPRESENTATION OF SOURCE CODE

(75) Inventors: Harish Kantamneni, Redmond, WA (US); Andrew Cherry, Everett, WA (US); Anders Hauge, Seattle, WA (US); Amanda Silver, Seattle, WA (US); Nathan Carlson, Redmond, WA (US); Anthony Crider, Mill Creek, WA (US); Abhijeet S. Shah, Redmond, WA (US); Ming Hong Zhu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 931 days.

(21) Appl. No.: 12/770,814

(22) Filed: Apr. 30, 2010

(65) Prior Publication Data

US 2011/0271261 A1 Nov. 3, 2011

(51) Int. Cl.
*G06F 9/45* (2006.01)
*G06F 9/455* (2006.01)

(52) U.S. Cl.
CPC .................. *G06F 9/45516* (2013.01)

(58) Field of Classification Search
CPC ................................... G06F 9/45516
USPC ....................................... 717/146
See application file for complete search history.

(56) References Cited

U.S. PATENT DOCUMENTS

| | | | |
|---|---|---|---|
| 5,187,789 A * | 2/1993 | O'Hair | G06F 8/20 |
| 5,734,908 A * | 3/1998 | Chan | G06F 8/445 |
| | | | 717/154 |
| 6,643,630 B1 | 11/2003 | Pegatoquet et al. | |
| 7,032,216 B1 | 4/2006 | Nizhegorodov | |
| 7,120,898 B2 | 10/2006 | Grover et al. | |
| 7,240,342 B1 * | 7/2007 | Bharadwaj | G06F 8/41 |
| | | | 717/145 |
| 2004/0243986 A1* | 12/2004 | Nishiyama | G06F 9/45508 |
| | | | 717/139 |
| 2007/0234325 A1* | 10/2007 | Bobrovsky | G06F 9/45516 |
| | | | 717/151 |
| 2009/0328012 A1 | 12/2009 | Aharoni et al. | |

OTHER PUBLICATIONS

Robert P. Wilson et al., "SUIF: An Infrastructure for Research on Parallelizing and Optimizing Compilers", Dec. 1994, ACM SIGPLAN Notices, vol. 29, No. 12, pp. 31-37.*
"Self Hosted Winxed: Why and How", Retrieved at << http://notfound.posterous.com/self-hosted-winxed-why-and-how >>, Nov. 26, 2009, pp. 2.

(Continued)

*Primary Examiner* — Wei Zhen
*Assistant Examiner* — Lanny Ung
(74) *Attorney, Agent, or Firm* — Fiala & Weaver P.L.L.C.

(57) ABSTRACT

A computer-implemented method includes compiling one or more segments of code during run-time of a process executing at one or more processors of a computer system. The compilation produces a high-level intermediate representation of the one or more segments of the code. The high-level intermediate representation is modifiable by the process, without executing the high-level intermediate representation, to generate a modified high-level intermediate representation that is executable by the process.

20 Claims, 6 Drawing Sheets

(56) References Cited

OTHER PUBLICATIONS

Falk, et al., "Design of a WCET-Aware C Compiler", Retrieved at <<http://ieeexplore.ieee.org/stamp/stamp.jsp?arnumber=04115464 >>, ESTMED, Proceedings of the 2006 IEEE/ACM/IFIP Workshop on Embedded Systems for Real Time Multimedia, Oct. 26-27, 2006, pp. 121-126.

Necula, et al., "CIL: Intermediate Language and Tools for Analysis and Transformation of C Programs", Retrieved at http://www.eecs.berkeley.edu/~necula/Papers/cil_cc02.pdf>>, Lecture Notes in Computer Science, vol. 2304, Proceedings of the 11th International Conference on Compiler Construction, Apr. 8-12, 2002, pp. 213-228.

Leupers, et al., "An Executable Intermediate Representation for Retargetable Compilation and High-Level Code Optimization", Retrieved at << http://www.iss.rwth-aachen.de/lancecompiler/files/samos2003.pdf >>, In International Conference on Information Communication Technologies in Education (SAMOS 2003), Jun. 2003, pp. 6.

Flautner et al., "Design of a High Level Intermediate Representation for Attribute-based Analysis," retrieved at <http://www.eecs.umich.edu/compress/publications/mirv-pldi.pdf>, Oct. 9, 1998, pp. 1-11.

\* cited by examiner

MODIFIABLE HIGH-LEVEL INTERMEDIATE REPRESENTATION OF SOURCE CODE

BACKGROUND

Existing compilers typically produce a compilation result by transforming source code from a high-level programming language into a lower-level language (e.g., assembly language or machine code). Some compilers may produce a high-level abstract representation of the source code that is intended for inspection by a user. Such high-level abstract representations may allow a program to inspect the compilation result of the source code. However, high-level abstract representations that are inspectable may not be executable. Existing compilers may create a high-level representation of program code, but the high-level representation is output to a file (e.g., in an immutable custom file format). Because the compilation result is output to a file, it may not be possible to inspect and modify the compilation result during run-time of the process.

SUMMARY

The present disclosure is directed to a hosted compiler (i.e., a compiler that is hosted by a particular process) that produces a modifiable high-level intermediate representation of a compilation result during run-time of a process. The usage of a high-level intermediate representation may allow for inspection, modification, and execution of the compilation result during run-time of the process. The inspection and modification of the high-level intermediate representation may be performed without executing the high-level intermediate representation. For example, the hosted compiler may expose an application programming interface (API) for compiling program code into the high-level intermediate representations in the form of one or more expression trees or other high-level intermediate representation. The expression trees or other high-level intermediate representation may be created and stored in-memory (e.g., in random access memory (RAM)) for inspection, modification, and execution. A modified (e.g., user-modified or a process-modified) high-level intermediate representation may be executed by the process during run-time of the process without stopping the run-time of the process. Users may also modify behavior of the process by compiling user code that modifies the process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
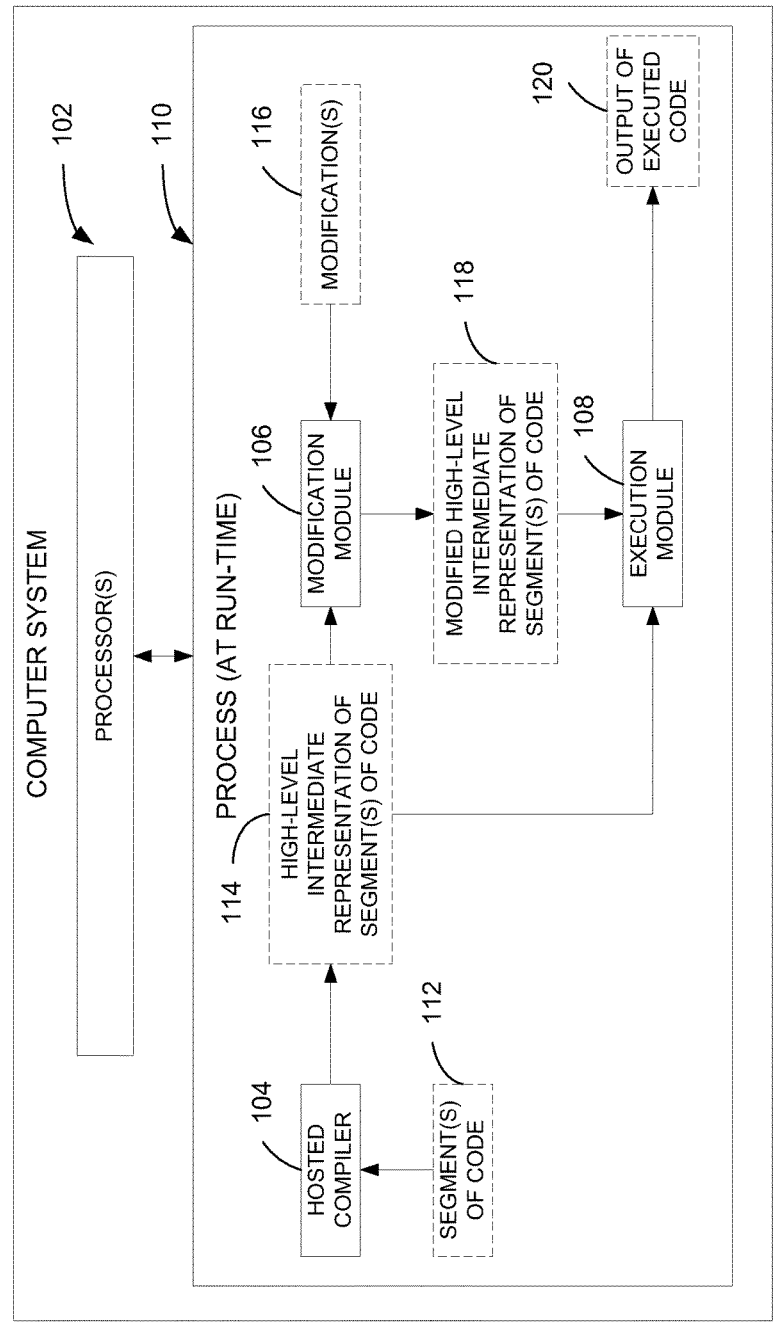
FIG. 1 is a block diagram to illustrate a particular embodiment of a system to produce a high-level intermediate representation of source code during run-time of a process.

In a particular embodiment, a computer-implemented method includes compiling one or more segments of code during run-time of a process executing at one or more processors of a computer system. The compilation produces one or more high-level intermediate representations of the one or more segments of the code. The one or more high-level intermediate representations is modifiable by the process, without executing the high-level intermediate representation, to generate a modified high-level intermediate representation that is executable by the process. Each of the one or more high-level intermediate representations is also inspectable (e.g., examinable) by the process. In a particular embodiment, each segment of source code is compiled to produce a corresponding high-level intermediate representation.

In another particular embodiment, a computer system includes one or more processors, a hosted compiler, a modification module, and an execution module. The hosted compiler compiles one or more segments of code to produce a high-level intermediate representation of the one or more segments of the code during run-time of a process executing at the one or more processors. The modification module modifies the high-level intermediate representation of the one or more segments of the code, without executing the high-level intermediate representation, during the run-time of the process. The execution module executes the modified high-level intermediate representation of the one or more segments of the code during the run-time of the process. Thus, an intermediate representation output by the compiler may be modified (e.g., by changing function calls or parameters) without executing the intermediate representation. The intermediate representation and modified intermediate representation may also be executed by the process during run-time.

In another particular embodiment, a computer-readable storage medium includes instructions that are executable by a computer system. During run-time of a process executing at one or more processors of the computer system, the instructions cause the computer system to compile one or more segments of code to produce a first high-level intermediate representation of the one or more segments of the code. The instructions further cause the computer system to modify the first high-level intermediate representation of the one or more segments of the code (e.g., by changing function calls or parameters), without executing the high-level intermediate representation, to produce a second high-level intermediate representation. The instructions further cause the computer system to execute the second high-level intermediate representation of the one or more segments of the code during the run-time of the process.

An application may benefit from the ability to programmatically compile textual program code (e.g., source code) and to inspect, transform, and execute the compilation result (e.g., the result of compiling the textual program code). For example, a user may write code to be compiled and executed within the context of the application. It may be advantageous to be able to inspect and process the compilation result before executing the compilation result. With existing compiler technologies, there may be no easy way for the user to analyze the compilation result. For example, existing compilers typically produce a compilation result intended for machine execution (e.g., x86 assembler or machine code) or may produce a high-level representation that is intended for inspection by the user. That is, existing compilers may produce compilation output that is either inspectable or executable, but not both inspectable and executable. The present disclosure describes a method of generating one or more high-level intermediate representations that may allow for inspection, modification, and execution of a compilation result (e.g., a user-modified or process-modified compilation result) during run-time of the process.

Referring to FIG. 1, an illustrative embodiment of a computer system 100 to produce a modifiable high-level intermediate representation of one or more segments of code is illustrated. The computer system 100 includes one or more processors 102, a hosted compiler 104, a modification module 106, and an execution module 108. The computer system 100 of FIG. 1 may allow a high-level intermediate representation of code (e.g., program code or user code) to be modified during run-time of a process 110 to generate a modified high-level intermediate representation that is executable by the process 110. The modifications may be made by the process 110. In a particular embodiment, the modifications may be made by a user or may be made by the process 110 based on user input.

For example, during run-time of the process 110 executing at the one or more processors 102, the hosted compiler 104 is operable to compile the one or more segments of code 112 to produce a high-level intermediate representation 114 of the one or more segments of code 112. The one or more segments of code 112 can include portions of source code files, entire source code files, or any combination thereof. A portion of a source code file may include one or more lines of source code representing a class, a method, a function, some other programming entity, or a part thereof. The modification module 106 is operable to modify the high-level intermediate representation 114 during the run-time of the process 110 to produce a modified high-level intermediate representation 118. The execution module 108 is operable to execute the modified high-level intermediate representation 118 during the run-time of the process 110 to generate an output 120. The execution module may also be operable to execute the high-level intermediate representation 114.

In operation, the hosted compiler 104 compiles the one or more segments of program code 112 to produce the high-level intermediate representation 114 of the one or more segments of program code 112. The high-level intermediate representation 114 may be inspected, modified, and executed during run-time of the process 110. The one or more segments of program code 112 may include Visual Basic .NET (i.e., VB.Net) code, one or more other computer-recognized languages, or any combination thereof. In the case of VB.Net code, a public API may be exposed for compiling the VB.Net code in the form of .Net strings into the high-level intermediate representation 114. As an example, the high-level intermediate representation 114 may be in the form of language integrated query (LINQ) expression trees (Dynamic Language Runtime expression trees).

In a particular embodiment, the hosted compiler 104 parses the one or more segments of program code 112, performs a semantic analysis of the one or more segments of program code 112, and produces a compilation result. Rather than outputting the compilation result as intermediate language to a file, the hosted compiler 104 may create one or more in-memory expression trees. In one embodiment, the in-memory expression trees include LINQ expression trees that are based on classes from the "System.Linq.Expressions" namespace in the .Net Framework. As a modifiable high-level intermediate representation of the compilation result of the hosted compiler 104, the LINQ expression trees may allow for inspection, modification, and execution of the compilation result during run-time of the process 110.

The modification module 106 may allow the process 110 to inspect and to modify the high-level intermediate representation 114 during run-time of the process 110. The inspection and modification may be performed without executing the high-level intermediate representation. Thus, when the high-level intermediate representation 114 is modified, the process 110 may be executing but the high-level intermediate representation 114 itself may not be executing. In one embodiment, the modification module 106 may be associated with a public API that allows input of the one or more modifications 116. For example, in the case of a LINQ expression tree, the one or more modifications 116 may include modifications to one or more parent LINQ expressions (e.g., parent nodes of the LINQ expression tree) or modifications to one or more child LINQ expressions (e.g., child nodes of the LINQ expression tree).

The execution module 108 may execute either the high-level intermediate representation 114 or the modified high-level intermediate representation 118 during the run-time of the process 110 to produce the output 120.

In one embodiment, the high-level intermediate representation 114 is modified based on a context of the process 110. The context of the process 110 may include an available symbol (e.g., a variable, function, class, method, interface, or data type that is exposed to the process 110). In one embodiment, modifying the high-level intermediate representation 114 includes changing a variable, changing a function, changing an error-checking condition, or any combination thereof.

The modified high-level intermediate representation 118 may be executed during the run-time of the process 110. Execution of the modified high-level intermediate representation 118 may result in modification to an attribute of the process 110. To illustrate, the attribute of the process 110 may include a background color, and execution of the modified high-level intermediate representation 118 may result in modification of the background color.

The one or more segments of code 112 may be compiled during the run-time of the process 110, and the high-level intermediate representation 114 may be modified (e.g., via the modification module 106 of FIG. 1) during the run-time of the process 110 without stopping the process 110, without restarting the process 110, and without starting another process. In-process compilation (i.e., compilation in the main operating system process of a running application) may allow for higher throughput compared to compilation performed out of process. Further, in-process compilation may enable inspection, modification, and execution of the compilation result, regardless of the programming language(s) used to define the source code. As an example, iterative testing may be performed by creating and executing multiple modified high-level intermediate representations during run-time of a single process (e.g., the process 110 of FIG. 1). The ability to create and execute multiple representations during the run-time of a single process may provide convenience and faster testing, among other advantages. Moreover, in-process compilation may enable software developers to define generic (e.g., context-independent) source code during design-time and make contextual modifications to the compiled source code during compile-time/run-time. Thus, in-process compilation may enable context-independent source code to be tailored for specific application contexts prior to execution.

Figure 2:
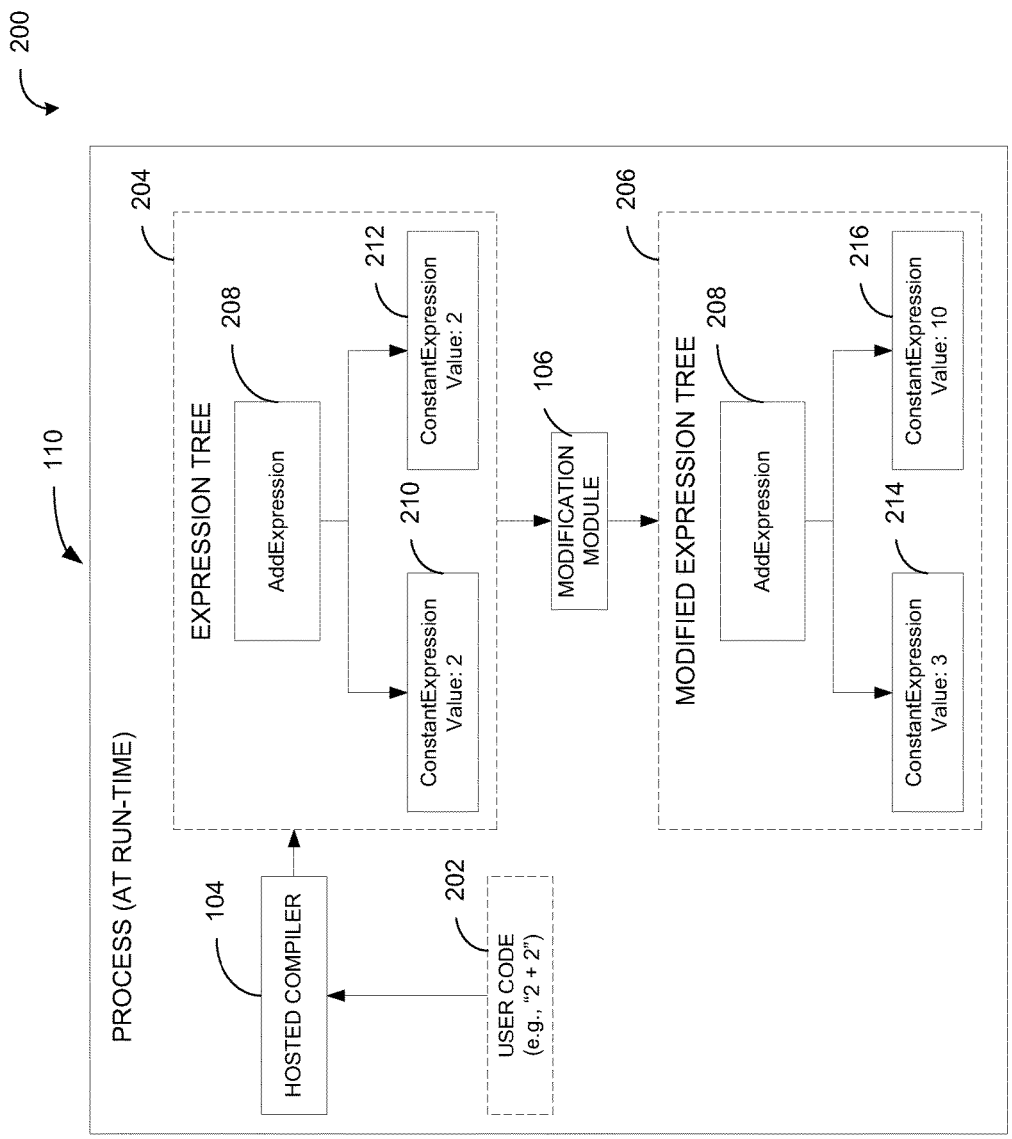
FIG. 2 is a diagram that illustrates a particular embodiment of a high-level intermediate representation of source code that may be produced during run-time of a process.

Referring to FIG. 2, a particular embodiment of a high-level intermediate representation of source code that is produced during run-time of a process is illustrated, at 200. In the embodiment illustrated, the process of FIG. 2 includes the process 110 of FIG. 1, and the hosted compiler of FIG. 2 includes the hosted compiler 104 of FIG. 1. FIG. 2 illustrates an example of a high-level intermediate representation (e.g., an expression tree 204) being modified (e.g., via the modification module 106 of FIG. 1) during run-time of the process 110 to produce a modified high-level intermediate representation (e.g., a modified expression tree 206).

In the embodiment illustrated in FIG. 2, the source code received at the hosted compiler 104 is user-specified. During run-time of the process 110, the hosted compiler 104 of FIG. 2 is operable to compile user code 202 (e.g., the segments of code 112 of FIG. 1) to produce a high-level intermediate representation of the user code 202. In the embodiment illustrated, the user code 202 includes the expression "2+2", and the high-level intermediate representation produced by the hosted compiler 104 includes the expression tree 204. The expression tree 204 produced by the hosted compiler 104 may be modified to produce the modified expression tree 206.

In one embodiment, the expression tree 204 includes the high-level intermediate representation 114 of FIG. 1, and the modified expression tree 206 includes the modified high-level intermediate representation 118 of FIG. 1. As an example, the expression tree 204 may be a LINQ expression tree. In the embodiment illustrated, the expression tree 204 includes a parent expression 208 (e.g., "AddExpression"), a first child expression 210 (e.g., "ConstantExpression Value: 2"), and a second child expression 212 (e.g., "ConstantExpression Value: 2"). Alternately, a high-level intermediate representation other than an expression tree may be modified and executed. In some embodiments, the expression tree 204 can include any number of parent expressions and any number of associated child expressions. It should be noted that the expression tree 204 may not be limited to "Add" and "Constant" nodes. The expression tree 204 may include any kind of node.

The expression tree 204 produced by the hosted compiler 104 may be modified to produce the modified expression tree 206. For example, the modifications may be program-provided modifications (as opposed to user-provided modifications). In one embodiment, the modification module 106 of FIG. 1 may be used to modify the expression tree 204 produced by the hosted compiler 104. In the embodiment illustrated, the first child expression 210 (e.g., "ConstantExpression Value: 2") of the expression tree 204 has been modified to produce a modified first child expression 214 (e.g., "ConstantExpression Value: 3"). Further, the second child expression 212 (e.g., "ConstantExpression Value: 2") of the expression tree 204 has been modified to produce a modified second child expression 216 (e.g., "ConstantExpression Value: 10"). In this illustrative example, the program modifications to the expression tree 204 produced by the hosted compiler 104 include modifications to both child expressions 214, 216. In alternative embodiments, the program may modify the parent expression 208, the first child expression 210, the second child expression 212, or any combination thereof to produce the modified expression tree 206. It should be noted that the illustrated expression trees are for exemplary purposes only. Expression trees may be more or less complex (e.g., have different ratios of parent nodes to child nodes). The modified expression tree 206 includes semantic information that is used to execute the modified expression tree.

The user code 202 may be compiled during the run-time of the process 110, and the expression tree 204 may be modified during the run-time of the process 110 without starting another process. Further, the modified expression tree 206 may be executed during the run-time of the process 110 without stopping the process 110, without restarting the process 110, and without starting another process (and without retrieving additional context information). In-process compilation (i.e., compilation within a main operating system process of a running application) may allow for higher throughput compared to executing compilers out-of-process. Further, in-process compilation may improve the ability of a user or a process to inspect, modify, and execute the compilation result.

Figure 3:
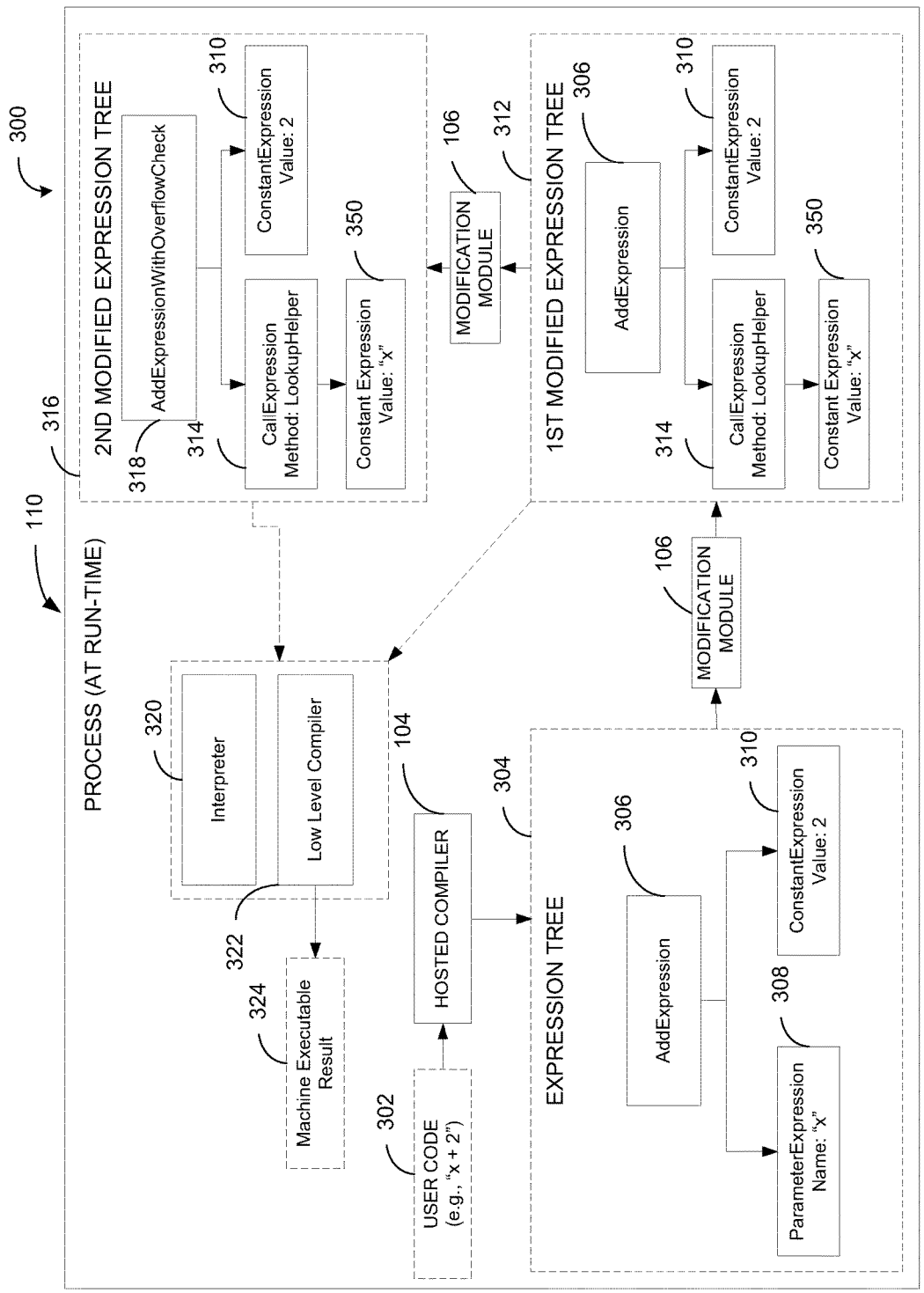
FIG. 3 is a diagram to illustrate a particular embodiment of high-level intermediate representations of source code that may be produced during run-time of a process.

Referring to FIG. 3, a second particular embodiment of high-level intermediate representations of source code that are produced during run-time of a process is illustrated, at 300. In the embodiment illustrated, the process of FIG. 3 includes the process 110 of FIG. 1, and the hosted compiler of FIG. 3 includes the hosted compiler 104 of FIG. 1. FIG. 3 illustrates an example of a high-level intermediate representation (e.g., an expression tree 304) being modified during run-time of the process 110 to produce a first modified high-level intermediate representation (e.g., a first modified expression tree 312). FIG. 3 further illustrates an example of a modified high-level intermediate representation (e.g., the first modified expression tree 312) being further modified during run-time of the process 110 to produce a second modified high-level intermediate representation (e.g., a second modified expression tree 316).

During run-time of the process 110, the hosted compiler 104 of FIG. 3 is operable to compile user code 302 to produce a high-level intermediate representation of the user code 302. In the embodiment illustrated, the user code 302 includes the expression "x+2", and the high-level intermediate representation produced by the hosted compiler 104 includes the expression tree 304. The expression tree 304 produced by the hosted compiler 104 may be modified to produce the first modified expression tree 312 and may be further modified to produce the second modified expression tree 316.

In one embodiment, the expression tree 304 includes the high-level intermediate representation 114 of FIG. 1, and the first modified expression tree 312 includes the modified high-level intermediate representation 118 of FIG. 1. FIG. 3 illustrates that the high-level intermediate representation produced by the host compiler 104 may be modified multiple times by the user or process. As an example, the expression tree 304 may be a LINQ expression tree. In the embodiment illustrated, the expression tree 304 includes a parent expression 306 (e.g., "AddExpression"), a first child expression 308 (e.g., "ParameterExpression Name: x"), and a second child expression 310 (e.g., "ConstantExpression Value: 2").

The expression tree 304 produced by the hosted compiler 104 may be modified (e.g., via the modification module 106 of FIG. 1) to produce the first modified expression tree 312. In the embodiment illustrated, the first child expression 308 (e.g., "ParameterExpression Name: x") of the expression tree 304 has been modified to produce a modified first child expression 314 (e.g., "CallExpression Method: LookupHelper" having an argument child node 350 "Constant Expression Value: 'x'"). Thus, the high-level intermediate representation may allow the program (or user) to provide symbol-resolution information post-compilation. In this case, the second child expression 310 (e.g., "ConstantExpression Value: 2") of the expression tree 304 has not been modified. In this illustrative example, the modifications (e.g., user modifications or process modifications) to the expression tree 304 produced by the hosted compiler 104 include modifications to the first child expression 308. In alternative embodiments, the modifications may include modifications to the parent expression 306, the first child expression 308, the second child expression 310, or any combination thereof to produce the first modified expression tree 312.

As shown in FIG. 3, a low level compiler 322 may compile the second modified expression tree 316 into a machine-executable result 324 without retrieving additional semantic information. In one embodiment, the execution module 108 of FIG. 1 includes the low level compiler 322, and the machine-executable result 324 is executed to produce the output 120 of the execution module 108. In another embodiment, the first modified expression tree 312 (e.g., the first modified high-level intermediate representation) is executable by the process 110 via a run-time interpreter 320 without further compilation.

In the embodiment illustrated in FIG. 3, the first modified expression tree 312 is further modified (e.g., via the modification module 106 of FIG. 1 or via another modification module) to produce the second modified expression tree 316. In the embodiment illustrated, the parent expression 306 of the first modified expression tree 312 has been modified to produce a modified parent expression 318 that includes error-checking (e.g., the parent expression "AddExpressionWithOverflowCheck"). In this case, the first child expression 314 (e.g., "CallExpression Method: LookupHelper" having the argument child node 350 "Constant Expression Value: 'x'") and the second child expression 310 (e.g., "ConstantExpression Value: 2") of the first modified expression tree 312 have not been modified. In this illustrative example, the modifications to the first modified expression tree 312 include modifications to the parent expression 308. In alternative embodiments, the modifications may include modifications to the parent expression 306, the first child expression 314, the second child expression 310, or any combination thereof to produce the second modified expression tree 316.

As shown in FIG. 3, the low level compiler 322 may compile the second modified expression tree 316 into a machine-executable result 324 without retrieving additional semantic information. In one embodiment, the execution module 108 of FIG. 1 includes the low level compiler 322, and the machine-executable result 324 is executed to produce the output 120 of the execution module 108. In another embodiment, the second modified expression tree 316 (e.g., the second modified high-level intermediate representation) is executable by the process 110 via the run-time interpreter 320 without further compilation.

The user code 302 may be compiled during the run-time of the process 110 and the expression tree 304 may be modified during the run-time of the process 110 without starting another process. As shown in FIG. 3, the expression tree 304 may be modified multiple times during the run-time of the process 110 without starting other processes. Further, the modified expression trees 312, 316 may be executed during the run-time of the process 110 without stopping the process 110, without restarting the process 110, and without starting other processes. In-process compilation (i.e., compilation in the main operating system process of a running application) may allow for higher throughput compared to compilation out of process. Further, in-process compilation may improve the ability of the user or program to inspect, modify, and execute the compilation result. It should be noted that although FIG. 3 illustrates user code, in-process compilation, inspection, modification, and execution may similarly be performed for non-user code (e.g., program code). Furthermore, it should be noted that many operations described herein as being performed by a user may also be performed by a process and vice versa. For example, both users and processes may modify a high-level intermediate representation.

Figure 4:
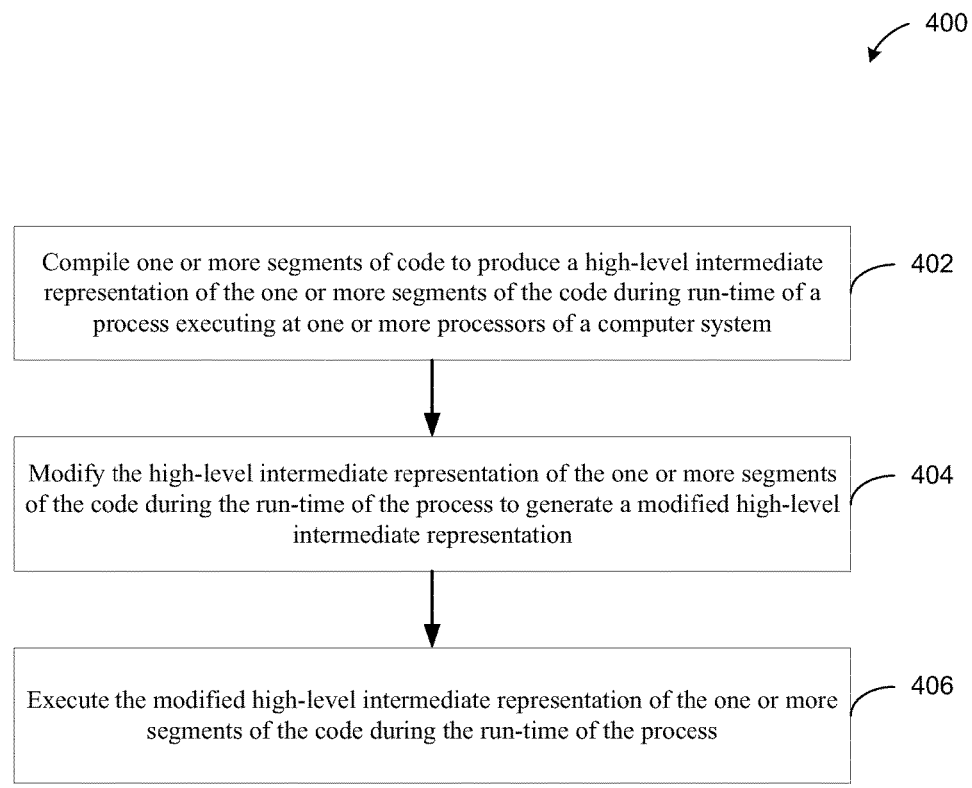
FIG. 4 is a flow diagram to illustrate a particular embodiment of a computer-implemented method of producing a high-level intermediate representation of source code during run-time of a process.

Referring to FIG. 4, a particular embodiment of a computer-implemented method of producing a high-level intermediate representation of source code during run-time of a process is illustrated, at 400.

The method includes compiling one or more segments of code to produce a high-level intermediate representation of the one or more segments of the code during run-time of a process executing at one or more processors of a computer system, at 402. For example, the one or more segments of code may include the one or more segments of code 112 of FIG. 1. The one or more segments of code 112 of FIG. 1 may be compiled by the hosted compiler 104 to produce the high-level intermediate representation 114 during run-time of the process 110 executing at the one or more processors 102 of the computer system 100. As another example, the one or more segments of code may include the user code 202 of FIG. 2. The user code 202 of FIG. 2 may be compiled by the hosted compiler 104 to produce the expression tree 204 during run-time of the process 110. The expression tree 204 may be executable by the process 110.

The method further includes modifying the high-level intermediate representation of the one or more segments of the code during the run-time of the process to generate a modified high-level intermediate representation, at 404. For example, the high-level intermediate representation 114 of FIG. 1 may be modified during the run-time of the process 110 to generate the modified high-level intermediate representation 118. As another example, the expression tree 204 of FIG. 2 may be modified during the run-time of the process 110 to generate the modified expression tree 206. In other embodiments, the expression tree 204 may be inspected instead of or in addition to be being modified. The expression tree 204 may be "inspectable" because the expression tree 204 may be represented in a human readable format (e.g., as opposed to binary code that may be difficult to read).

In the embodiment illustrated in FIG. 4, the method also includes executing the modified high-level intermediate representation of the one or more segments of the code during the run-time of the process, at 406. For example, the modified high-level intermediate representation 118 of FIG. 1 may be executed by the execution module 108 during the run-time of the process 110. As another example, the modified expression tree 206 of FIG. 2 may be executed during the run-time of the process 110. The ability to create and execute multiple representations during the run-time of a single process may provide user convenience and faster testing, among other advantages.

Figure 5:
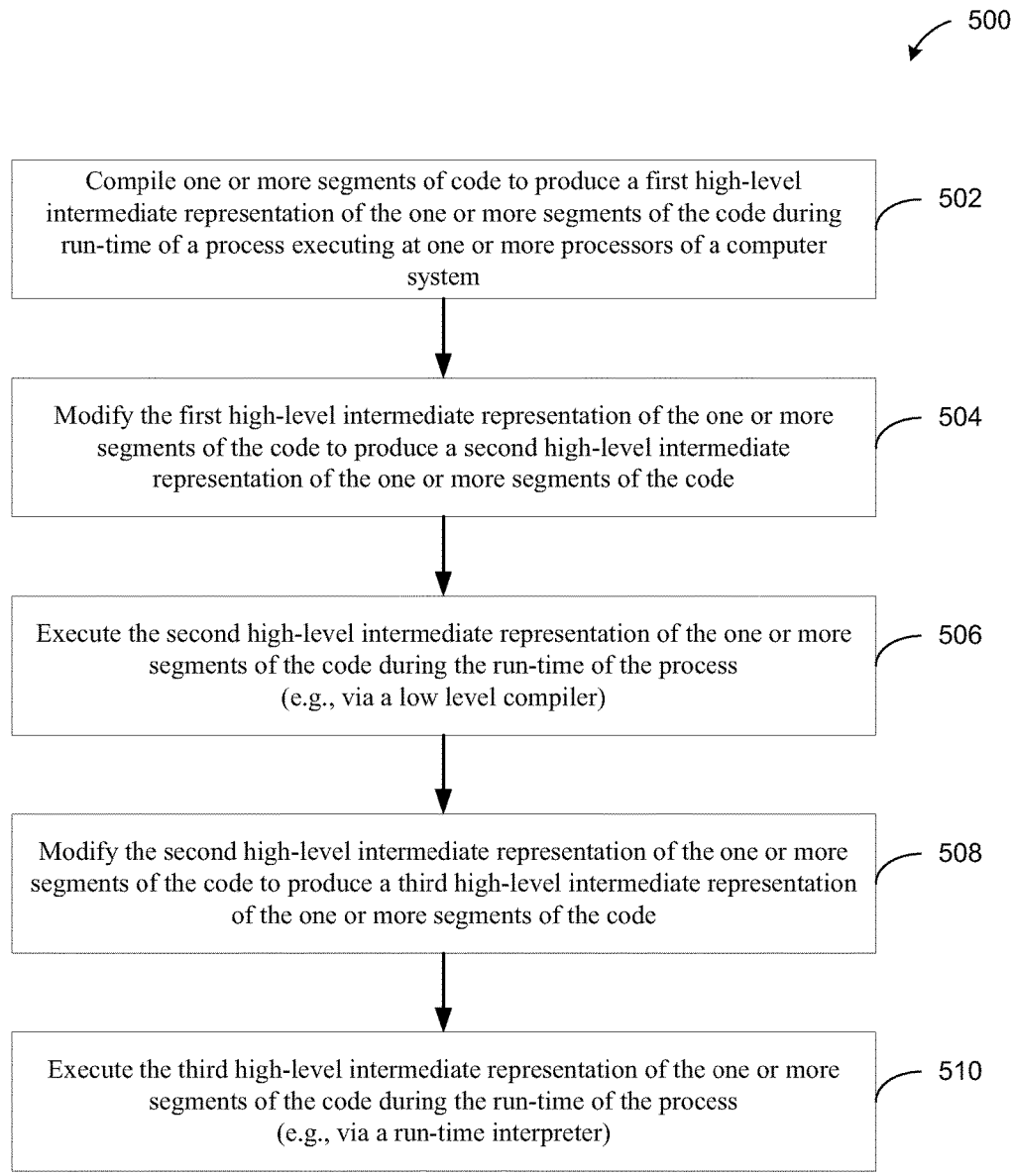
FIG. 5 is a flow diagram to illustrate a particular embodiment of a computer-implemented method of producing multiple high-level intermediate representations of source code during run-time of a process.

Referring to FIG. 5, a second particular embodiment of a computer-implemented method of producing multiple high-level intermediate representations of source code during run-time of a process is illustrated, at 500.

The method includes compiling one or more segments of code to produce a first high-level intermediate representation of the one or more segments of code during run-time of a process executing at one or more processors of a computer system, at 502. For example, the one or more segments of code may include the user code 302 of FIG. 3. The user code 302 of FIG. 3 may be compiled by the hosted compiler 104 to produce the expression tree 304 during run-time of the process 110.

The method also includes modifying the first high-level intermediate representation of the one or more segments of code to produce a second high-level intermediate representation of the one or more segments of the code, at 504. For example, the expression tree 304 of FIG. 3 may be modified during the run-time of the process 110 to generate the first modified expression tree 312.

In the embodiment illustrated, the method further includes executing the second high-level intermediate representation of the one or more segments of the code during the run-time of the process, at 506. For example, the first modified expression tree 312 of FIG. 3 may be executed via the low level compiler 322 during the run-time of the process 110 or via the run-time interpreter 320 without further compilation.

The method further includes modifying the second high-level intermediate representation of the one or more segments of the code to produce a third high-level intermediate representation of the one or more segments of the code, at 508. For example, the first modified expression tree 312 of FIG. 3 may be modified during the run-time of the process 110 to generate the second modified expression tree 316. Any number of subsequent modifications to the second modified expression tree 316 may similarly be performed.

In the embodiment illustrated, the method further includes executing the third high-level intermediate representation of the one or more segments of the code during the run-time of the process, at 510. For example, the second modified expression tree 316 of FIG. 3 may be executed via the low level compiler 322 during the run-time of the process 110 or via the run-time interpreter 320 without further compilation. The ability to create and execute multiple representations during the run-time of a single process may provide user convenience and faster testing, among other advantages.

Figure 6:
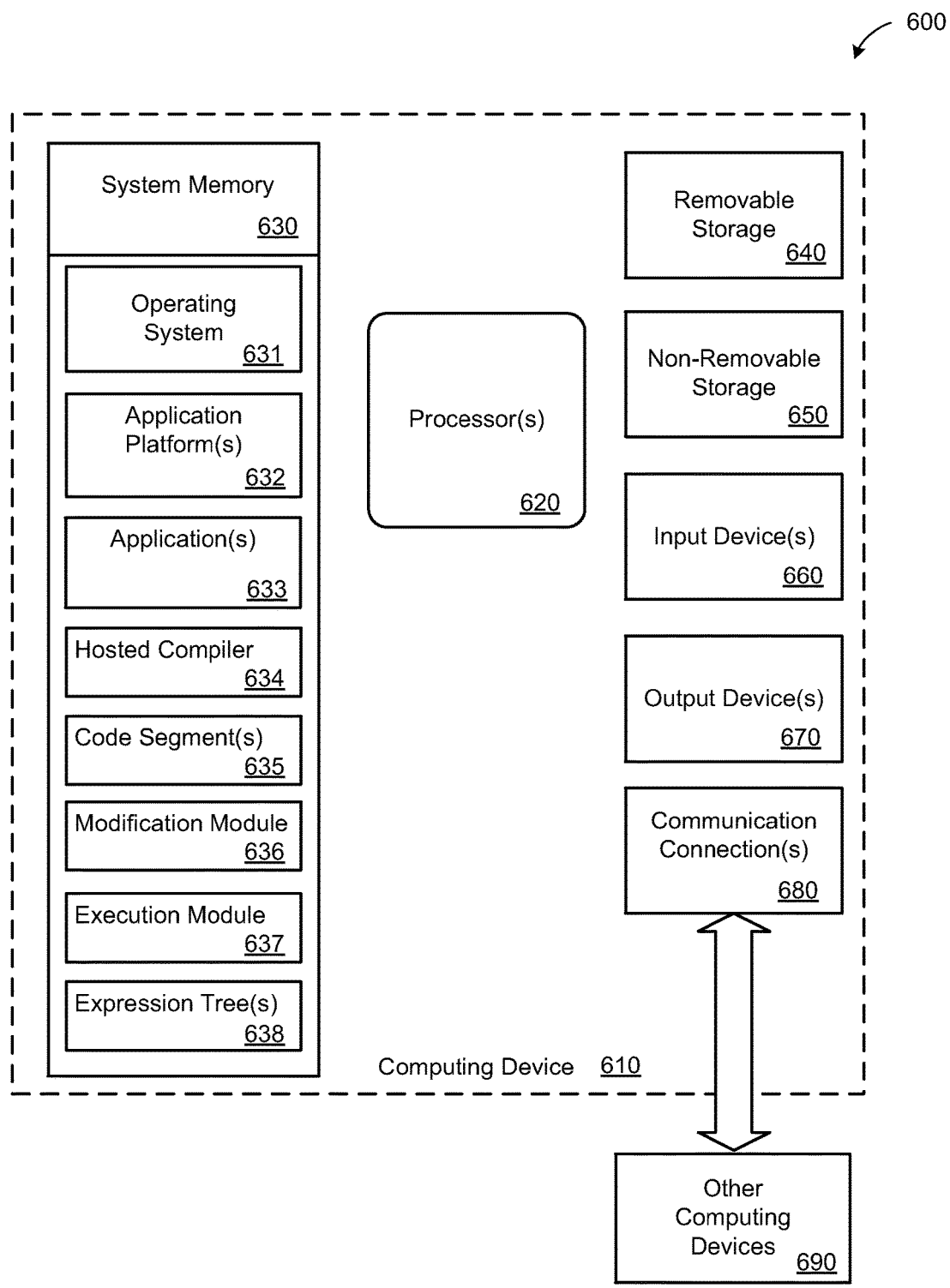
FIG. 6 is a block diagram of a computing environment including a computing device operable to support embodiments of computer-implemented methods, computer program products, and system components as illustrated in FIGS. 1-5.

FIG. 6 depicts a block diagram of a computing environment 600 including a computing device 610 operable to support embodiments of computer-implemented methods, computer program products, and system components according to the present disclosure. In an illustrative embodiment, the computing device 610 may include the computer system 100 of FIG. 1.

The computing device 610 includes at least one processor 620 and a system memory 630. For example, the at least one processor 620 may include the one or more processors 102 of FIG. 1. Depending on the configuration and type of computing device, the system memory 630 may be volatile (such as random access memory or "RAM"), non-volatile (such as read-only memory or "ROM," flash memory, and similar memory devices that maintain stored data even when power is not provided), or some combination of the two. The system memory 630 typically includes an operating system 631, one or more application platforms 632, one or more applications 633, and other program instructions. In the present disclosure, the system memory 630 also includes a hosted compiler 634, one or more code segments 635, a modification module 636, an execution module 637, and one or more expression trees 638. For example, the compiler 634 may include the hosted compiler 104 of FIGS. 1-3. The one or more code segments 635 may include the one or more code segments 112 of FIG. 1, the user code 202 of FIG. 2, or the user code 302 of FIG. 3. The modification module 636 may include the modification module 106 of FIG. 1, and the execution module 637 may include the execution module 108 of FIG. 1. The one or more expression trees 638 may include the first high-level intermediate representation 114 or the modified high-level intermediate representation 118 of FIG. 1. Further, the one or more expression trees 638 may include the expression tree 204 and the executable modified expression tree 206 of FIG. 2. Further, the one or more expression trees 638 may include the expression tree 304 and the modified executable expression trees 312 and 316 of FIG. 3.

The computing device 610 may also have additional features or functionality. For example, the computing device 610 may also include removable and/or non-removable additional data storage devices such as magnetic disks, optical disks, tape, and standard-sized or flash memory cards. Such additional storage is illustrated in FIG. 6 by removable storage 640 and non-removable storage 650. Computer storage media may include volatile and/or non-volatile storage and removable and/or non-removable media implemented in any technology for storage of information such as computer-readable instructions, data structures, program components or other data. The system memory 630, the removable storage 640 and the non-removable storage 650 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 610. Any such computer storage media may be part of the computing device 610.

The computing device 610 may also have input device(s) 660, such as a keyboard, mouse, pen, voice input device, touch input device, etc. Output device(s) 670, such as a display, speakers, printer, etc. may also be included. The computing device 610 also contains one or more communication connections 680 that allow the computing device 610 to communicate with other computing devices 690 over a wired or a wireless network.

It will be appreciated that not all of the components or devices illustrated in FIG. 6 or otherwise described in the previous paragraphs are necessary to support embodiments as herein described. For example, the removable storage 640 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
    during run-time of an operating system process executing at a computer system:
        compiling, within the operating system process, one or more segments of code to produce and store a high-level intermediate representation of the one or more segments of code in volatile memory,
        wherein the high-level intermediate representation is user-inspectable and user-modifiable within the operating system process while the high-level intermediate representation is stored in the volatile memory during run-time of the operating system process without executing the high-level intermediate representation and without starting another process, the high-level intermediate representation stored in the volatile memory without being output to a file.

2. The computer-implemented method of claim 1, wherein the code is user-specified, the method further comprising producing high-level intermediate representations corresponding to each of the one or more segments of code.

3. The computer-implemented method of claim 1, wherein compiling the one or more segments of code is performed by a compiler hosted by the operating system process.

4. The computer-implemented method of claim 1, wherein the modified high-level intermediate representation comprises semantic information, wherein the modified high-level intermediate representation is executable by the operating system process by compiling the modified high-level intermediate representation into a machine-executable result without retrieving additional semantic information, the method further comprising executing the machine-executable result.

5. The computer-implemented method of claim 1, wherein the modified high-level intermediate representation is executable by the operating system process via a run-time interpreter without further compilation of the modified high-level intermediate representation and without retrieving additional context information outside of the operating system process.

6. The computer-implemented method of claim 1, wherein the high-level intermediate representation of the one or more segments of the code comprises one or more expression trees.

7. The computer-implemented method of claim 6, wherein the high-level intermediate representation is modified during the run-time of the operating system process based on a context of the operating system process.

8. The computer-implemented method of claim 6, wherein modifying the high-level intermediate representation includes changing a variable, changing a function, changing an error-checking condition, or any combination thereof.

9. The computer-implemented method of claim 1, further comprising executing the modified high-level intermediate representation during the run-time of the operating system process.

10. The computer-implemented method of claim 9, wherein execution of the modified high-level intermediate representation results in modification to an attribute of the operating system process.

11. The computer-implemented method of claim 9, said executing the modified high-level intermediate representation during the run-time of the operating system process comprising:
    executing the modified high-level intermediate representation during the run-time of the operating system process without needing to restart the operating system process.

12. The computer-implemented method of claim 1, wherein the one or more segments of code are compiled during the run-time of the operating system process without starting another operating system process, wherein the high-level intermediate representation is modified during the run-time of the operating system process without starting another operating system process, and wherein the modified high-level intermediate representation is executed during the run-time of the operating system process without starting another operating system process.

13. The computer-implemented method of claim 1, wherein the one or more segments of code represent a class, a method, a function, or any combination thereof.

14. A computer system, comprising:
   one or more processors to run an operating system process;
   a hosted compiler that is executable within the operating system process to compile one or more segments of code to produce and store a high-level intermediate representation of the one or more segments of the code in volatile memory during run-time of the operating system process, the high-level intermediate representation stored in the volatile memory without being output to a file;
   a modification module that is executable within the operating system process to modify, based on user input, the high-level intermediate representation of the one or more segments of the code while the high-level intermediate representation is stored in the volatile memory, without executing the high-level intermediate representation and without starting another process, during the run-time of the operating system process, the high-level intermediate representation being user-inspectable during run-time of the operating system process; and
   an execution module that is executable within the operating system process to execute the modified high-level intermediate representation of the one or more segments of the code, during the run-time of the operating system process, via a run-time interpreter without further compilation.

15. The computer system of claim 14, wherein the hosted compiler compiles the one or more segments of code during the run-time of the operating system process.

16. A computer-readable memory comprising instructions that, when executed by a computer system, cause the computer system to:
   during run-time of an operating system process executing at one or more processors of the computer system:
      compile within the operating system process one or more segments of code to produce and store a first high-level intermediate representation of the one or more segments of the code in volatile memory, the first high-level intermediate representation stored in the volatile memory without being output to a file;
      modify, based on user input, within the operating system process, the first high-level intermediate representation of the one or more segments of the code while the high-level intermediate representation is stored in the volatile memory, without executing the first high-level intermediate representation and without starting another process, to produce a second high-level intermediate representation of the one or more segments of the code, the first high-level intermediate representation being user-inspectable during run-time of the operating system process; and
      execute within the operating system process the second high-level intermediate representation of the one or more segments of the code via a run-time interpreter without further compilation.

17. The computer-readable memory of claim 16, further comprising instructions that, when executed by the computer system, cause the computer system to:
   during the run-time of the operating system process:
   modify the second high-level intermediate representation of the one or more segments of the code to produce a third high-level intermediate representation of the one or more segments of the code; and
   execute the third high-level intermediate representation of the one or more segments of the code.

18. The computer system of claim 14, wherein the code is user-specified.

19. The computer-readable memory of claim 16, wherein the code is user-specified.

20. The computer-readable memory of claim 16, wherein the second high-level intermediate representation is executable by the operating system process via a run-time interpreter without further compilation of the second high-level intermediate representation and without retrieving additional context information outside of the operating system process.

* * * * *